(12) United States Patent
Krawczyk

(10) Patent No.: US 7,776,447 B2
(45) Date of Patent: Aug. 17, 2010

(54) COMPOSITE MATERIALS AND FUSER MEMBERS HAVING IMPROVED ADHESION BETWEEN A METAL LAYER AND A POLYIMIDE SUBSTRATE

(75) Inventor: Karina Anne Krawczyk, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 962 days.

(21) Appl. No.: 11/337,957

(22) Filed: Jan. 23, 2006

(65) Prior Publication Data

US 2007/0172643 A1   Jul. 26, 2007

(51) Int. Cl.
*B32B 1/08*  (2006.01)
(52) U.S. Cl. ...................... 428/458; 510/166
(58) Field of Classification Search ........... None
See application file for complete search history.

(56) References Cited

U.S. PATENT DOCUMENTS

| | | | |
|---|---|---|---|
| 3,642,569 A * | 2/1972 | Gerow ..................... 428/334 |
| 3,775,176 A * | 11/1973 | Cross et al. ............... 427/353 |
| 3,932,689 A * | 1/1976 | Watanabe et al. ........... 428/418 |
| 5,547,759 A * | 8/1996 | Chen et al. ................ 428/421 |
| 5,709,949 A * | 1/1998 | Chen et al. ................ 428/421 |
| 5,998,034 A * | 12/1999 | Marvil et al. .............. 428/422 |
| 6,228,288 B1 * | 5/2001 | Chacko .................... 252/511 |
| 6,284,329 B1 | 9/2001 | Matienzo et al. |
| 6,442,365 B1 * | 8/2002 | Schlueter et al. ........... 399/328 |
| 6,720,084 B2 | 4/2004 | Maeyama et al. |
| 6,730,409 B1 | 5/2004 | Angelopoulos et al. |
| 6,818,290 B1 * | 11/2004 | Chopra et al. .............. 428/328 |
| 2001/0048829 A1 * | 12/2001 | Hamilton et al. ........... 399/331 |
| 2005/0189628 A1 | 9/2005 | Tamemasa et al. |

* cited by examiner

*Primary Examiner*—D. Lawrence Tarazano
*Assistant Examiner*—Gregory Clark

(57) ABSTRACT

Composite materials, and fuser members incorporating the composite materials comprise a polyimide substrate, a metal layer, and a primer layer between the polyimide substrate and the metal layer. The primer layer comprises metal particles dispersed in a polymer, and adheres the metal layer to the polyimide substrate.

22 Claims, 1 Drawing Sheet

COMPOSITE MATERIALS AND FUSER MEMBERS HAVING IMPROVED ADHESION BETWEEN A METAL LAYER AND A POLYIMIDE SUBSTRATE

FIELD OF THE INVENTION

The present invention is generally directed to composite materials, which demonstrate improved adhesion between a polyimide substrate and a metal layer, and in one embodiment is specifically directed to composite materials for fuser member applications.

BACKGROUND OF THE INVENTION

Metal plating, for example, copper plating, onto polyimide is a prevalent industrial application, especially in industries such as the microelectronics industry. Because excellent adhesion between the metal layer and polyimide is crucial for many applications, the pretreatment of the polyimide surface becomes an important step in ensuring the required adhesion. Current polyimide pretreatment methods include forming a conductive surface for electroplating via swell-and-etch techniques or sputter deposition of a tie-coat.

Swell-and-etch techniques do not provide effective adhesion for all polyimide substrates, and, in some instances, may yield negligible adhesion. Sputter deposition of a tie-coat provides more effective adhesion than swell and etch techniques; however, sputter deposition requires a significant capital investment, and may fail to produce adequate adhesion, especially for three-dimensional objects.

As demand increases for fuser members in recording devices, such as printers and copiers, the need arises for improvements in composite materials having desirable properties and durability. Particularly, composite materials including a polyimide layer and a metal layer plated on the polyimide layer are employed with increasing frequency in fuser members. However, some such composite materials, as described above, do not exhibit sufficient adhesion between the polyimide substrate and the metal layer. Accordingly, improvements in such composite materials, fuser members incorporating these composite materials, and in the methods of making these composite materials are desired.

SUMMARY OF THE INVENTION

According to a first embodiment of the present invention, a composite material is provided. The composite material comprises a polyimide substrate, a metal layer, and a primer layer between the polyimide substrate and the metal layer. The primer layer comprises metal particles dispersed in a polymer, and adheres the metal layer to the polyimide substrate.

According to a second embodiment of the present invention, a fuser member is provided. The fuser member comprises a polyimide substrate, a metal layer, and a primer layer between the polyimide substrate and the metal layer. The primer layer comprises metal particles dispersed in a polymer, and adheres the metal layer to the polyimide substrate.

According to a third embodiment of the present invention, a method of making a composite material is provided. The method comprises providing a polyimide substrate, applying a primer layer composition comprising metal particles dispersed in a polymer onto the polyimide substrate, and providing a metal layer on the primer layer, wherein the primer layer adheres the metal layer to the polyimide substrate.

The composite materials, fuser members, and methods of the present invention provide improvements and advantages by improving adhesion between a polyimide substrate and a metal layer, for example, by adhering the polyimide substrate to the metal layer via a primer layer comprising metal particles dispersed in a polymer. The composite materials, fuser members, and methods are particularly advantageous for improving adhesion in three dimensional composite materials. These and additional features and advantages provided by the composite materials, fuser members, and methods of the present invention will be more fully understood in view of the following detailed description.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

The present invention is directed to composite materials, fuser members incorporating these composite materials, and methods of making composite materials. The composite material comprises a polyimide substrate, a metal layer, and a primer layer between the polyimide substrate and the metal layer. The primer layer comprises metal particles dispersed in a polymer, and adheres the metal layer to the polyimide substrate.

Figure 1:
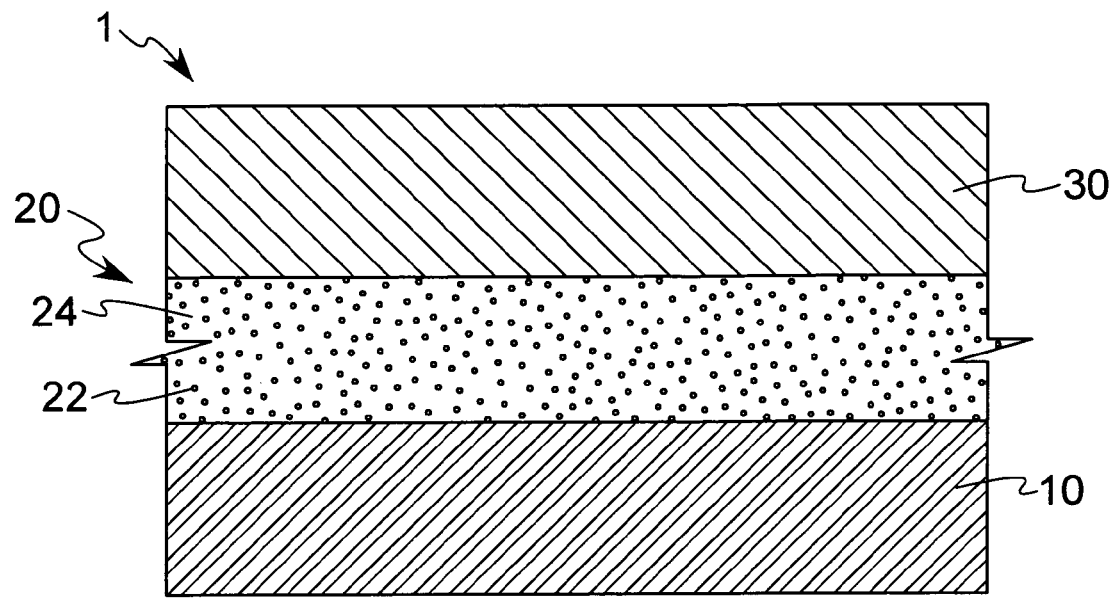
FIG. 1 is a schematic illustration of a composite material according to one or more embodiments of the present invention.

Referring to FIG. 1, a composite material 1 is provided. The composite material 1 comprises a polyimide substrate 10, a metal layer 30, and a primer layer 20 between the polyimide substrate 10 and the metal layer 30.

The polyimide substrate 10 may comprise any suitable polyimide material known to one skilled in the art. For example, polyimide, polyamideimide, polyetherimide, or combinations thereof may be used in the substrate 10. In a further embodiment, the polyimide substrate 10 may comprise conductive filler. The conductive filler may comprise any suitable conductive filler known to one of ordinary skill in the art. In one embodiment, the polyimide substrate comprises a boron nitride filler. The thickness of the polyimide substrate 10 may vary depending on the application. In one embodiment, the polyimide substrate 10 may comprise a thickness of about 25 to 75 μm.

The primer layer 20, which is applied to the polyimide substrate 10, comprises metal particles 22 dispersed in a polymer 24. The particle may be dispersed homogeneously or heterogeneously. The primer layer 20 may be applied to the polyimide substrate 10 using any suitable method known to one skilled in the art. In one specific embodiment, the primer layer 20 may be applied to the polyimide substrate 10 by spraying the polymer-particle composition on the polyimide substrate 10. Conventional spraying techniques may be advantageously employed. In another embodiment, the primer layer 20 may be applied to the polyimide substrate 10 by spreading the polymer-particle composition on the polyimide substrate 10. The composition may be applied singularly or in the presence of a solvent followed by drying and/or airing.

The primer layer polymer 24 may comprise polyamide-imide; however other suitable polymers are also contemplated. The primer layer metal particles 22 may comprise one or more metals, and in a specific embodiment one or more conductive metals. In one embodiment, the metal particles 22 comprise nickel. In other exemplary embodiments, the metal particles may comprise copper or gold, for example, copper or gold powder. The metal particles may be of any desired shape. In one embodiment, the primer layer metal particles 22 may comprise metal platelets, for example, nickel platelets, dispersed within the primer layer polymer 24.

The thickness of the primer layer 20 varies depending on the size of the metal particles 22. In one embodiment, the particles 22 may comprise an average particle size of about 2 to about 20 μm. Within the specification, average size refers to the average longest dimension of the particles. The primer layer 20 may comprise a thickness sufficient to improve adhesion between the polyimide substrate 10 and the metal layer 30. In one embodiment, the thickness is about 1 to about 50 μm. One suitable primer layer 20 material is AC-78, distributed by Whitford Corporation. AC-78 is a polyamide-imide resin with dispersed nickel platelets, wherein the nickel platelets have an average particle size of about 4 to about 15 μm. Suitably, this composition is used to form a thickness ranging from about 5 to about 25 μm. In accordance with yet another embodiment, the primer layer 20 may comprise at least about 25%, and more specifically at least about 50% by weight of the metal particles 22.

The primer layer 20, as described herein, provides good adhesion between the polyimide substrate 20 and the metal layer 30 without the need for additional pretreatment steps on the polyimide substrate 20. Of course, one or more pretreatment steps can be employed if desired. Moreover, because spray coating equipment costs significantly less than sputter deposition equipment, spraying a primer layer 20 onto the polyimide substrate 10 reduces the costs of producing these composite materials 1. Because spray coating and spreading equipment cost significantly less than sputter deposition equipment, spraying a primer layer 20 onto the polyimide substrate 10 can reduce the costs of producing these composite materials.

The metal layer 30, which is coupled to the primer layer 20, comprises a suitable conductive metal. In one embodiment, the metal layer comprises copper. The metal layer 30 may have any suitable thickness as desired for the application of the composite material. In one embodiment, the metal layer 30 may comprise a thickness of about 10 to about 100 μm. The metal layer 30 may be applied through any conventional application or deposition technique. In one embodiment, the metal layer 30 may be applied via electroplating, or electrocoating. The primer layer 20 may also eliminate additional steps, for example, an electroless copper plating step, and may further reduce any costs associated with these additional steps, such as equipment costs, chemical treatment costs, waste treatment costs, etc.

The primer layer 20 improves adhesion of the metal layer 30 to the polyimide substrate 10. The metal layer 30 couples to the primer layer 20 by adhering to the metal particles 22 of the primer layer 20. The adhesion of the metal particles 22 to the metal layer 30 depends on the metal particles 22 used in the primer layer 20 and the metal present in the metal layer 30. The metal layer 30 may have an adhesion value in the composite material of about 1 to about 5 lb/in, and about 2 lb/in in specific embodiments. Further, the primer layer 20 couples to the polyimide substrate 10 by adhering the polymer 24 of the primer layer 20 to the polyimide substrate 10.

Figure 2:
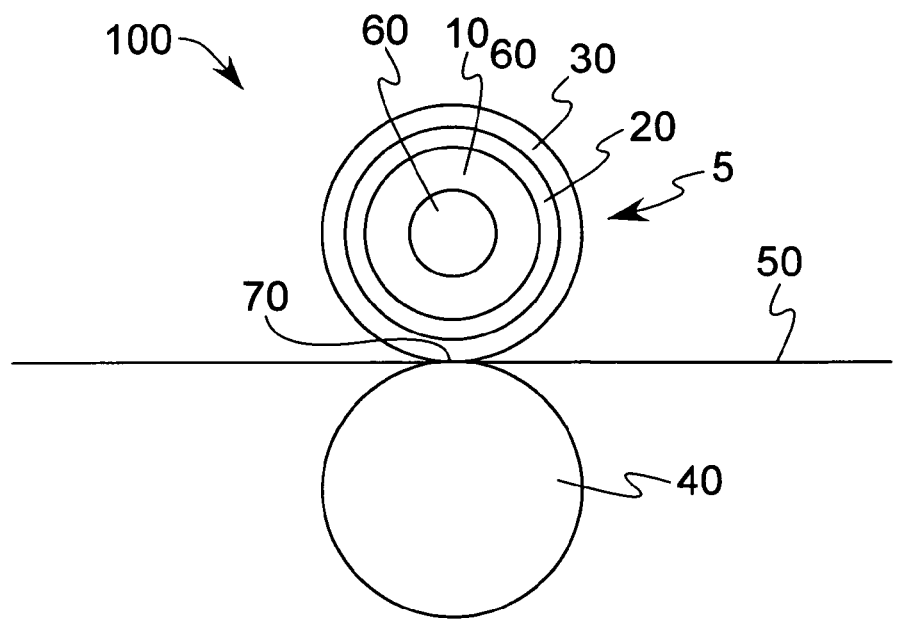
FIG. 2 is a schematic illustration of a fuser unit according to one or more embodiments of the present invention.

The above-described composite material 1 may be utilized in numerous industrial applications. Referring to FIG. 2, the composite material 1 may be used in fuser members 5. Fuser members 5 may comprise belts or rolls, or other suitable configurations known to one of ordinary skill in the art, and are utilized in fuser units 100 of devices, such as printers and copiers. As shown in FIG. 2, a fuser unit comprises a fuser member 5, for example, a roll, having a polyimide substrate 10, a primer layer 20, and a metal layer 30 as shown in FIG. 2. In one embodiment as shown in FIG. 2, the polyimide substrate 10 may contact an additional layer or component. In one embodiment, the polyimide substrate 10 may be applied over a metal mandrel 60. Moreover, the fuser unit 100 may also comprise a backup member 40 adjacent the fuser member 5 and operable to apply pressure at a fusing nip area 70, formed between the fuser member 5 and the backup member 40. The fuser member 5 applies toner to a recording medium, e.g. paper 50, as the recording medium 50 is fed between the backup member 40 and fuser member 5 at the fusing nip area 70.

The fuser member 5 may also comprise additional layers overlying the metal layer 30. Optionally, these layers may comprise materials directed to minimize sticking of the fuser member 5 to the recording medium 50 as toner is released. As a result, these additional layers may comprise suitable non-stick materials, such as fluoropolymers. In specific embodiments, the additional layers may comprise perfluoroalkoxy (PFA), polytetrafluoroethylene (PTFE), or combinations thereof.

Although the additional layers underlying or overlying the composite material were described only for fuser member applications, it is contemplated that additional layers may also be provided to the composite material for other desired composite material applications.

It is noted that terms like "specifically," "generally" "optionally", "preferably," "typically", "often", "especially" and the like are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A fuser member consisting essentially of:
   a polyimide substrate;
   a metal outer layer; and
   a primer layer between the polyimide substrate and the metal outer layer comprising metal particles dispersed in a polymer, wherein the primer layer adheres the metal outer layer to the polyimide substrate, the polymer comprising polyamide-imide, the primer layer directly contacting both the polyimide substrate and the metal outer layer, the primer layer being a single, unitary layer, wherein the metal particles are dispersed substantially homogeneously throughout the primer layer.

2. The fuser member of claim 1, wherein the primer layer metal particles comprise nickel.

3. The fuser member of claim 1 wherein the primer layer metal particles comprise nickel platelets dispersed within the primer layer polymer.

4. The fuser member of claim 1 wherein the primer layer comprises a thickness of about 1 to about 50 μm.

5. The fuser member of claim 1 wherein the primer layer metal comprises metal platelets.

6. The fuser member of claim 1 wherein the metal particles have an average particle size of about 2 to about 20 μm.

7. The fuser member of claim 1 wherein the primer layer comprises at least about 25% by weight of the metal particles.

8. The fuser member of claim 1 wherein the metal outer layer comprises copper.

9. The fuser member of claim 1 wherein the metal outer layer has an adhesion value of about 1 to about 5 lb$_f$/in.

10. The fuser member of claim 1 wherein the polyimide substrate comprises conductive filler.

11. A composite material according to claim 10 wherein the conductive filler comprises boron nitride.

12. A fuser member according to claim 1 wherein the fuser member comprises a roll.

13. A fuser member according to claim 1 wherein the fuser member comprises a belt.

14. A fuser unit adapted to fuse toner onto a recording medium at a fusing nip area comprising:
a fuser member according to claim 1;
and a backup member adjacent the fuser member and operable to apply pressure at the fusing nip area.

15. The fuser member of claim 1, wherein the primer layer is copolymer-free.

16. The fuser member of claim 1, wherein the metal particles comprise at least about 50% by weight of the primer layer.

17. The fuser member of claim 1, wherein the primer layer consists essentially of metal particles dispersed in polyamide-imide.

18. The fuser member of claim 1, wherein the metal outer layer comprises an electroplated copper layer.

19. The fuser member of claim 1, wherein the metal outer layer comprises a copper layer.

20. The fuser member of claim 1, wherein only the polyimide substrate and the primer layer are non-metal compositions containing conductive particles or filler.

21. A fuser member comprising:
a polyimide substrate;
a metal outer layer; and
a primer layer between the polyimide substrate and the metal outer layer comprising metal particles dispersed in a polymer, wherein the primer layer adheres the metal outer layer to the polyimide substrate, the polymer comprising polyamide-imide, the primer layer directly contacting both the polyimide substrate and the metal outer layer, the primer layer being a single, unitary layer with a substantially uniform composition throughout.

22. The fuser member of claim 21, wherein the metal outer layer comprises a copper layer.

* * * * *